Feb. 10, 1925.　　　　　　　　　　　　　　　1,525,488
H. M. AUSTIN
VALVE
Original Filed Dec. 9, 1922　　8 Sheets-Sheet 3

Fig. 3.

INVENTOR
HARRY M. AUSTIN
BY HIS ATTORNEY
Harry L. Smith

Feb. 10. 1925.                                              1,525,488
H. M. AUSTIN
VALVE
Original Filed Dec. 9, 1922    8 Sheets-Sheet 4

INVENTOR
HARRY M. AUSTIN
BY HIS ATTORNEY

Feb. 10, 1925.

H. M. AUSTIN

VALVE

Original Filed Dec. 9, 1922     8 Sheets-Sheet 5

INVENTOR
HARRY M. AUSTIN
BY HIS ATTORNEY

Feb. 10, 1925.

H. M. AUSTIN 1,525,488

VALVE

Original Filed Dec. 9, 1922    8 Sheets-Sheet 6

INVENTOR
HARRY M. AUSTIN
BY HIS ATTORNEY

Feb. 10. 1925.

H. M. AUSTIN 1,525,488

VALVE

Original Filed Dec. 9, 1922    8 Sheets-Sheet 7

INVENTOR
HARRY M. AUSTIN
BY HIS ATTORNEY
Harry L. Smith

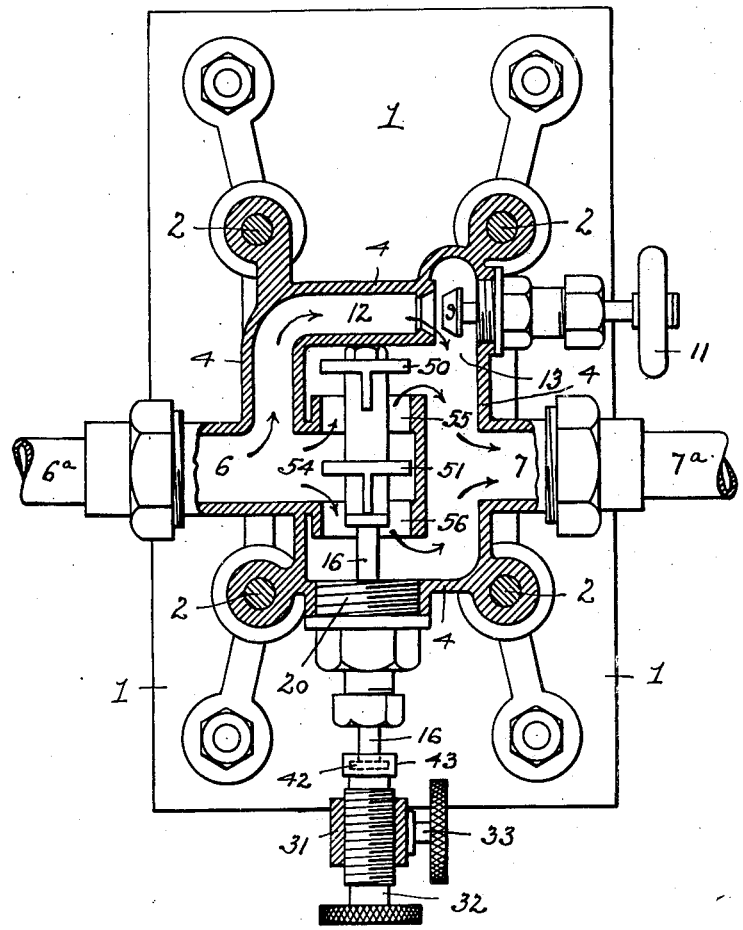

Patented Feb. 10, 1925.

1,525,488

UNITED STATES PATENT OFFICE.

HARRY M. AUSTIN, OF PHILADELPHIA, PENNSYLVANIA, ASSIGNOR TO COMBUSTION CONTROL COMPANY, OF PHILADELPHIA, PENNSYLVANIA, A PARTNERSHIP CONSISTING OF HARRY M. AUSTIN, THOMAS J. FORDE, HARRY E. SNYDER, AND DAVID W. LODGE.

VALVE.

Application filed December 9, 1922. Serial No. 605,914. Renewed December 26, 1924.

*To all whom it may concern:*

Be it known that I, HARRY M. AUSTIN, citizen of the United States, residing in Philadelphia, Pennsylvania, have invented certain Improvements in Valves, of which the following is a specification.

My invention relates generally to valves for controlling the flow of fluids and more particularly to valves for controlling the flow of fuel to oil or gas burners.

The object of my invention is to so construct a valve that a condition of the fluid flowing through it will automatically control the quantity of flow therethrough.

Illustrative of the uses to which my invention is particularly adapted I may point to that type of duplex valve used to control the flow of gas and air, as fuel, to a gas burner or to control the flow of oil and steam, as fuel, to an oil burner. Valves of this type as hitherto constructed, have required constant supervision and frequent adjustment in order that the flow therethrough should be maintained, in different respects, within certain necessary predetermined limits relating, for example, to pressure or temperature. When constructed in accordance with my invention the valves will be automatically regulated in all desired respects and the need of constant attention will be avoided.

Although my invention is capable of wide application and has many and varied uses, I shall, for the purpose of illustration, describe it as applied to a duplex valve controlling the flow of gas and air to a gas burner and in connection with such a valve where the flow therethrough is to be regulated so as to maintain the pressure within certain definite and predetermined limits. This description will be made with reference to the accompanying drawings wherein this particular embodiment of my invention is illustrated. In these drawings Fig. 1 is a side view of a duplex valve structure, of the character specified constructed in accordance with my invention.

Fig. 3 is a vertical sectional view, on the line 3—3, Fig. 1, with a certain auxiliary valve structure shown in closed position.

Fig. 10 is a view similar to Fig. 9 but with the auxiliary valve structure of this modified type shown in opened position.

The construction illustrated in Figs. 1 to 5, inclusive, will first be described. In these views there is shown a wall plate 1 upon which the valve structure, as a whole, is mounted. Projecting laterally from this plate are four studs 2 upon which are mounted hubs of a pair of similarly constructed valve casings 4 and 4$^a$, the casing 4 containing the valve structure which controls the flow of gas to the burner and the casing 4$^a$ containing the valve structure which controls the flow of air thereto.

Figure 1:
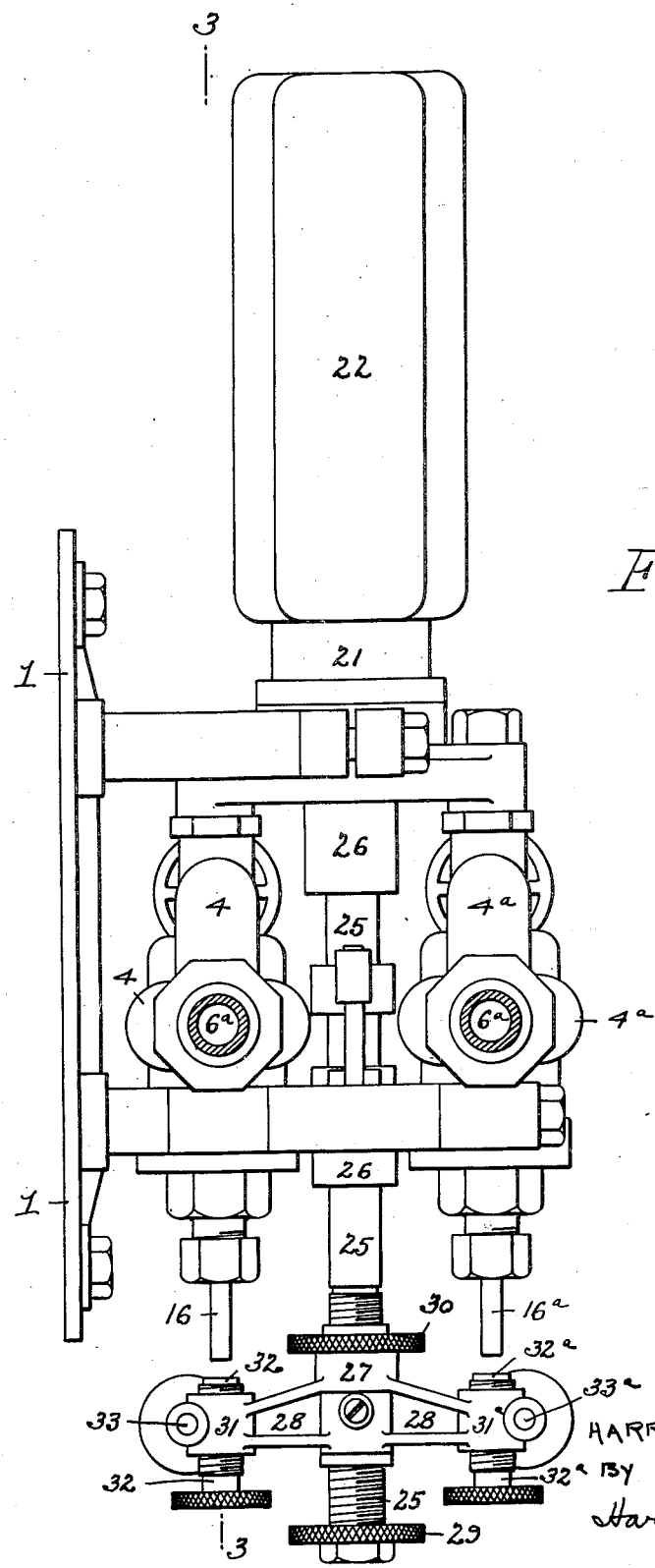
Figure 2:
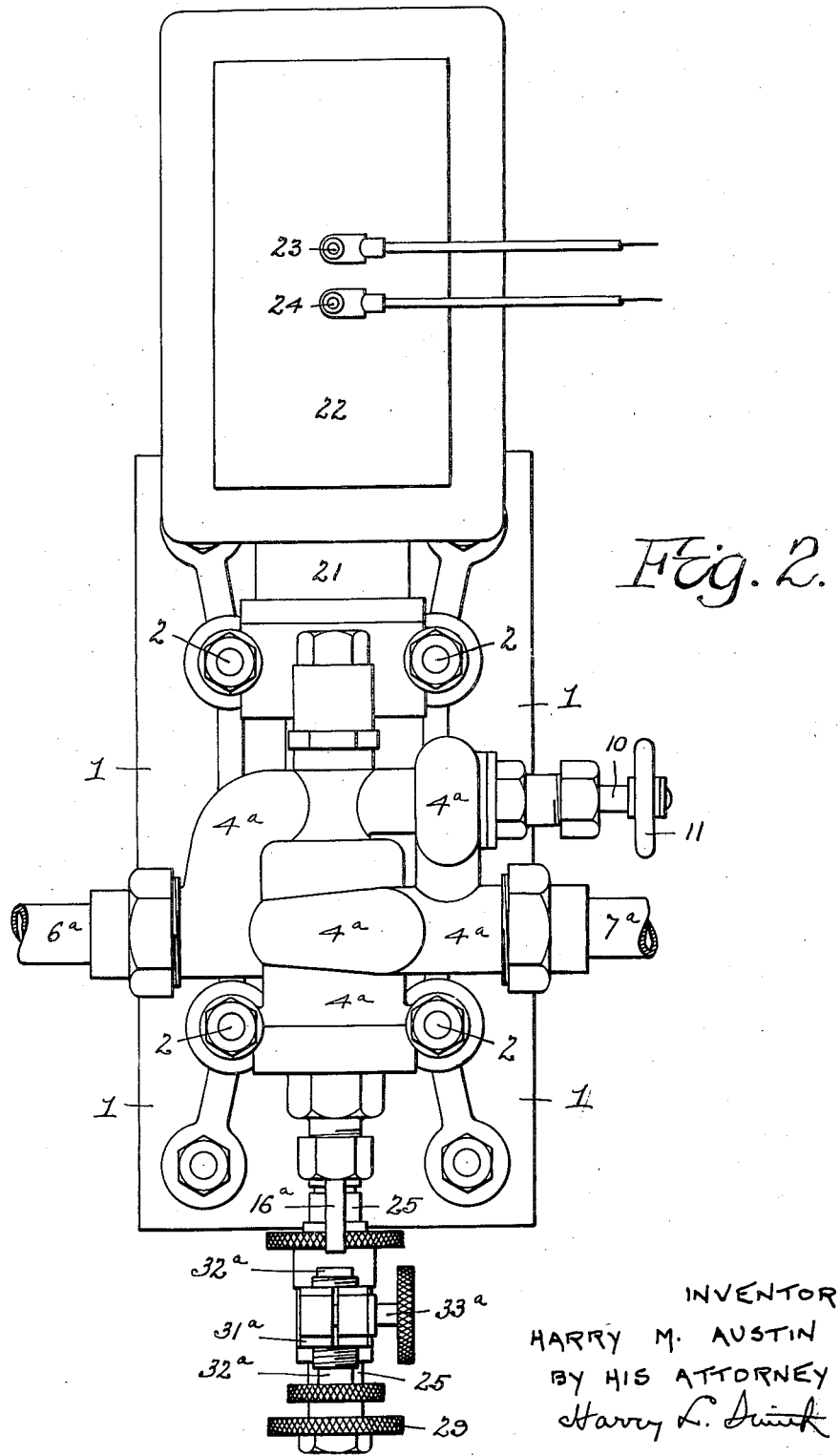
Fig. 2 is a face view of the same.
Figure 4:
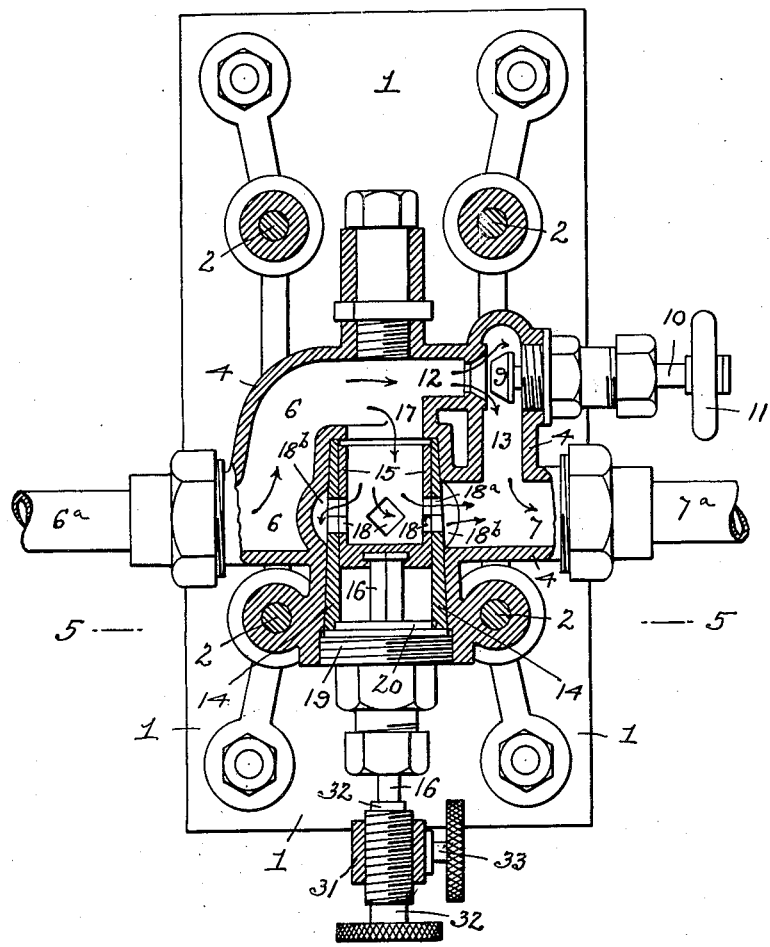
Fig. 4 is a view similar to Fig. 3 but with the auxiliary valve structure shown in opened position.

Referring more particularly to Figs. 3 and 4 of the drawings, wherein is illustrated the internal construction of the valve casing 4 there is shown a gas supply port 6 with which communicates a gas supply pipe 6$^a$ and a gas exhaust port 7 with which communicates a gas exhaust pipe 7$^a$.

Located above the exhaust port 7 is a primary valve 9 secured to the inner end of a screw stem 10 the outer end of which is equipped with a conventional hand wheel 11 by means of which the valve 9 may be opened or closed, the valve moving away from or towards its seat formed integrally with the casing 4 as the hand wheel 11 is turned in one direction or the other. Cooperating with this primary valve 9 is an individual gas inlet port 12, in communication with the gas supply port 6, and an individual gas outlet port 13, in communication with the gas exhaust port 7.

Formed integrally with the casing 4 and disposed substantially centrally therein is an internally tapered shell which receives a correspondingly externally tapered sleeve 14 which serves as a seat for a vertically slidable auxiliary valve 15, the latter being mounted upon the upper end of a valve stem 16 which extends downwardly below the lower limit of the casing 4 and has a lower end adapted to be acted upon by certain mechanism to be later described.

The auxiliary valve 15 is also provided with individual gas inlet and outlet ports, access to the interior of the valve being had through a gas inlet port 17 and escape therefrom being through ports 18 in the wall of the valve, corresponding ports 18$^a$ in the sleeve 14 and an annular port 18$^b$ formed in the cylindrical shell which contains the sleeve 14. The ports 18$^a$ each communicate with the port 18$^b$ and the latter is in communication with the gas exhaust port 7.

Thus it will be seen that, while the primary and auxiliary valves are possessed of a common supply port and a common exhaust port, they also each have individual inlet and outlet ports, the individual inlet ports being in communication with the common supply port and the individual outlet ports being in communication with the common exhaust port.

Figure 5:
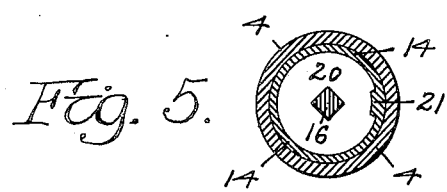
Fig. 5 is a horizontal sectional view, on the line 5—5, Fig. 4, illustrating certain of the elements of construction.

The construction by means of which the ports 18 and 18$^a$ are maintained in vertical alignment so that they may be brought into registry will now be described. The externally tapered sleeve 14, in which are the ports 18$^a$, is forced into place within the internally tapered shell, and maintained therein, by means of a screw plug 19 which bears against the lower edge of the sleeve. Upon the upper face of this screw plug rests a disk 20 adapted to lie within an annular groove formed in the inner edge of the lower face of the sleeve. This disk is notched at one side for the reception of a lug 21 formed on the sleeve, as is best shown in Fig. 5. This construction prevents rotation of the sleeve 14 in respect to the disk 20 and rotation of the valve 15 in respect to the disk is prevented by forming that portion of the valve stem 16 which engages the valve and which passes through the disk 20 of square, or other angular, cross section, as is also best shown in Fig. 5. In this manner the vertical alignment of the ports 18 and 18$^a$ is insured.

The valve structure contained within the casing 4$^a$ and which controls the flow of air to the burner is identical with that already described in connection with the casing 4 and a complete description is unnecessary, it being sufficient to say that this valve structure also comprises a primary valve and an auxiliary valve duplicating, in every respect, those previously described.

Disposed midway between the upper portions of the valve casings 4 and 4$^a$ and supported upon the upper studs 2 is the hub 21 of a coil casing 22 having positive and negative electric connections 23 and 24 (Fig. 2) and within which is adapted to play a solenoid plunger mounted at the upper end of a shaft 25 which is vertically slidable through bearings 26 mounted upon the studs 2.

Vertically adjustable upon the threaded lower end of the shaft 25 is the central hub 27 of a crosshead 28, this crosshead being maintained in any desired position of adjustment upon the shaft by means of lock nuts 29 and 30.

The laterally extending arms of the crosshead 28 terminate in split hubs 31 and 31$^a$ which are in axial alignment with, and below, the lower ends of the valve stems 16 and 16$^a$ upon the upper ends of which are carried the auxiliary valves 15 and 15$^a$ within the casings 4 and 4$^a$. Passing through the split hubs 31 and 31$^a$ are threaded vertically adjustable pusher blocks 32 and 32$^a$, they being adapted to cooperate, respectively, with the valve stems 16 and 16$^a$ and being capable of being fixed in any position of adjustment by means of clamp screws 33 and 33$^a$ carried by the split hubs 31 and 31$^a$.

Thus it will be seen that the pusher blocks may be adjusted vertically in respect to the corresponding valve stems with which they cooperate, either in unison, by adjustment of the crosshead upon the shaft, or individually, by local adjustment in respect to the crosshead.

Having thus described the construction of the structure 1 will now describe its operation and manner of use.

At the beginning, when the burner is to be lighted, the hand wheels of the primary valves are so turned as to open these valves to the proper extent to provide the necessary mixture to the burner. Gas and air then flow from the supply pipes, through the valve casings, past the opened primary valves, and out through the exhaust pipes to be mixed and carried to the burner. While this is taking place, as is shown by the arrows in Fig. 3, the pressure of the fluids forces the auxiliary valves downwardly as is also shown in this view. Any flow through the auxiliary valves is thus prevented. Should the pressure of the gas and air passing through the primary valves, however, fall below a predetermined point, electric current is caused to flow through the coil within the casing 22. To accomplish this, a pressure controlled circuit maker and breaker of any desired type is employed. Inasmuch as such a device forms no part of my invention but is merely used in connection therewith, no attempt has been made to illustrate it, it being deemed sufficient to say that it is properly positioned to be actuated by the exerted pressure. When, as has been said, the coil is energized, the solenoid therewithin is raised, raising its shaft 25. As this shaft lifts, the pusher blocks 32 and 32ª are brought into contact with the lower ends of the valve stems 16 and 16ª raising the auxiliary valves from the position shown in Fig. 3 to that shown in Fig. 4. The outlet ports of the auxiliary valves are thus brought into registry with the corresponding ports in the valve sleeves, and an additional flow through the structure is at once established, as is shown by the arrows in Fig. 4, the initial flow being maintained and supplementary flow through each auxiliary valve being permitted. When the increase in pressure reaches a predetermined point, the pressure controlled circuit maker and breaker is actuated to break the circuit through the coil within the casing 22. The coil is thus deenergized and the solenoid falls, its shaft carrying the crosshead 28 downwardly and relieving the stems of the auxiliary valves from the influence of the pusher blocks 32 and 32ª. Internal pressure within the auxiliary valves then forces them downwardly until the ports in their walls are carried out of registry with the corresponding ports in the sleeves and the extra flow through the valve structures is cut off. The flow is again through and past the primary valves only until such time as the pressure again falls below the predetermined point whereupon the coil is again energized and the cycle of operation is repeated.

By proper initial setting of the primary valves and by careful adjustment of the pusher blocks 32 and 32ª in respect to the stems of the auxiliary valves, it is possible to maintain a pressure of mixture as supplied to the burners which is rigidly held within such close limits as to be substantially constant. As an example, say it is desired to maintain, within the boiler, a pressure of 100 pounds. By setting the pressure controlled circuit maker and breaker so that it will establish a circuit through the coil when the pressure falls to 99 pounds and will deenergize the coil when the pressure rises to 101 pounds, the valve structure of my invention will prove so sensitive that the pressure will be always maintained within these limits, never varying more than one pound above or below the desired and predetermined point.

Should it at any time be desired to remove the auxiliary valves from within the casings it may easily be done, it merely being necessary to swing the crosshead 28 a quarter turn upon the shaft 25 so as to remove the pusher blocks from below the valve stems. The screw plugs 20 may then be backed out and the valves with their attendant mechanism lowered vertically from their seats. With the crosshead in this right angle position no portion of it is in the way of such valve removal.

Figure 6:
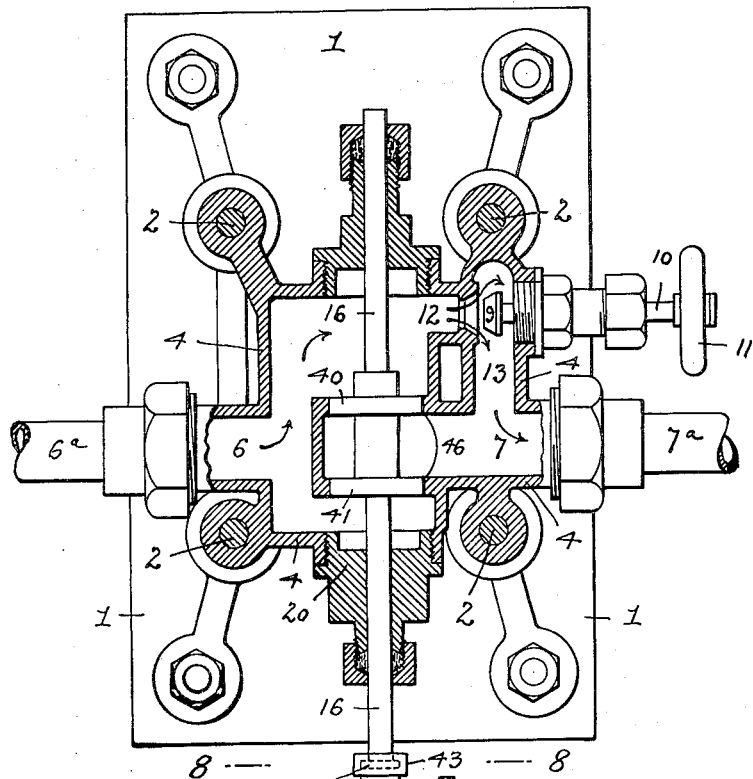
Fig. 6 is a view similar to Fig. 3 but illustrating an auxiliary valve structure of modified type, the same being shown in closed position.
Figure 8:
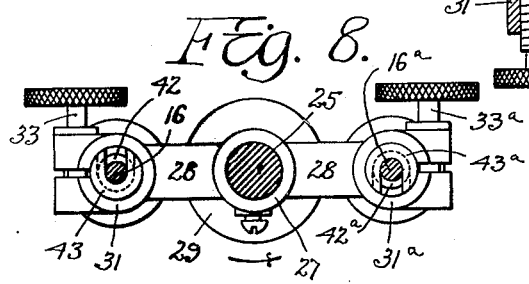
Fig. 8 is a horizontal sectional view, on the line 8—8, Fig. 6, illustrating a certain modified type of construction employed in connection with the auxiliary valve structure shown in Figs. 6 and 7.
Figure 7:
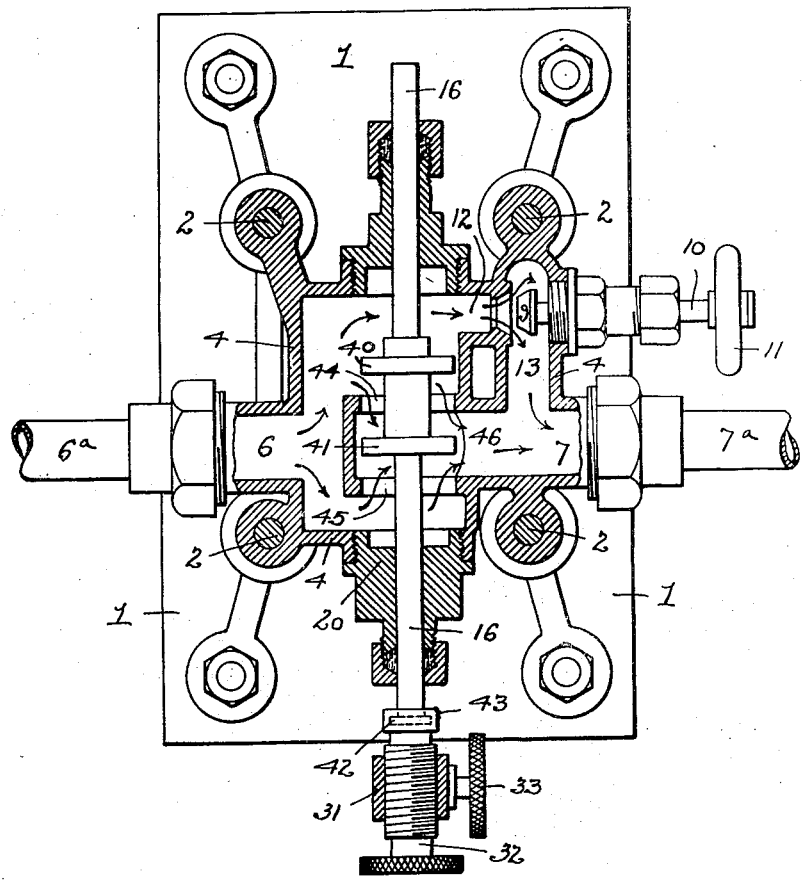
Fig. 7 is a view similar to Fig. 6 but with the auxiliary valve structure of modified type shown in opened position.

In Figs. 6, 7 and 8 is illustrated a valve structure similar to that already described but having a modified type of auxiliary valve. In this instance there is employed an auxiliary valve which is positively moved in each direction, there being a vertically inseparable connection between the top of each pusher block and the bottom of the corresponding valve stem. In these views there is shown a valve structure in which the primary valve 9 is the same as that previously described.

The auxiliary valve, however, is double, embodying two valve members 40 and 41 upon the valve stem 16, each of these members being adapted to a seat formed integrally with the casing 4. The lower end of the valve stem 16 is provided with an enlarged head 42 adapted to be engaged by a slotted cap 43 secured to the top of the pusher block 32. This cap is cut away, at one side, as shown in Fig. 8, to permit such swing of the crosshead 28 as will permit valve removal in the manner already described.

When the auxiliary valve is in closed position, as shown in Fig. 6, the flow is entirely past the primary valve 9. When, however, by an energizing of the coil, the valve is opened, as shown in Fig. 7, a double supplementary flow is established, in through the two individual inlet ports 44 and 45 of the auxiliary valve and out through the outlet port 46 of the same into the common exhaust port 7.

The construction is of course, as before, duplicated with respect to the other valve casing 4ª.

Figure 9:
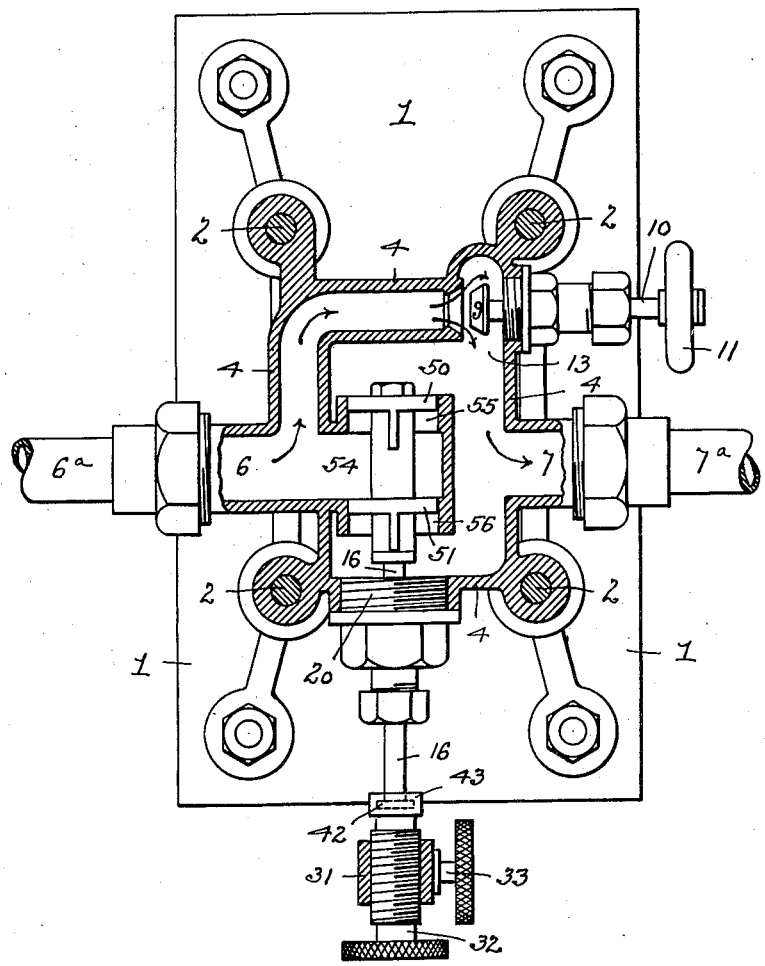
Fig. 9 is a view similar to Figs. 3 and 6 but illustrating still another modified type of auxiliary valve structure, the same being shown in closed position.

In Figs. 9 and 10 is illustrated a valve structure of yet another modified type of auxiliary valve. In this construction the auxiliary valve is again of double form, having valve members 50 and 51 mounted upon the stem 16, but the seats and ports are so arranged that, when the auxiliary valve is opened, the double supplementary flow is through a single individual inlet port 54, past the two valve members and out through the two individual outlet ports 55 and 56 into the common exhaust port 7. Otherwise the construction is very similar to that shown in Figs. 6 and 7, and it is, of course, duplicated within the other valve casing.

It is to be understood that my invention relates, broadly, to the valve structure as a whole and not to any particular embodiment or adaptation thereof. While I have illustrated and described my invention as applied to a duplex valve designed to control the flow of gas and air to a gas burner, I reiterate that this is merely an example of one of the many uses to which it may be put.

Similarly, while I have described the auxiliary valves as being under the control of a pressure controlled electric device, this also is purely given as but one instance. The control need not depend upon pressure, as it may well, in certain cases, rely upon the temperature maintained within the furnace wherein the burners are located, and be of a thermostatic nature. Furthermore, whether pressure, temperature or other condition be the controlling factor, its medium of operation may be other than electric, the mechanism employed to impart the necessary movement to the auxiliary valves being of a hydraulic, mechanical, or other nature.

As long as the operation of the auxiliary valves is automatically effected and is dependent upon a condition of flow, pressure or temperature resulting from combustion, my invention is embodied. The various forms under which it may make its appearance are such as will readily suggest themselves to the skilled engineer and do not all require to be illustrated and described as the examples which I have given are sufficient to render the scope and usage of my invention clear.

I claim:

1. The combination, in a duplex valve structure, of a pair of primary valves, a corresponding pair of auxiliary valves, each set of said valves having a common supply port and a common exhaust port, individual manually operable means for opening and closing each of said primary valves, and automatically operable means for simultaneously opening and closing said auxiliary valves.

2. The combination, in a duplex valve structure, of a pair of primary valves, a corresponding pair of auxiliary valves, each set of said valves having a common supply port and a common exhaust port, but each valve having individual inlet and outlet ports, such inlet ports of each set being in communication with the corresponding common supply port and such outlet ports of each set being in communication with the corresponding exhaust port, individual manually operable means for opening and closing each of said primary valves, and automatically operable means for simultaneously opening and closing said auxiliary valves.

3. The combination, in a duplex valve structure, of a pair of primary valves, a corresponding pair of auxiliary valves normally maintained in closed position, each set of said valves having a common supply port and a common exhaust port, individual manually operable means for opening and closing each of said primary valves, and automatically operable means for simultaneously opening said auxiliary valves.

4. The combination, in a duplex valve structure, of a pair of primary valves, a corresponding pair of auxiliary valves normally maintained in closed position, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for simultaneously opening said auxiliary valves.

5. The combination, in a duplex valve structure, of a pair of primary valves, a corresponding pair of auxiliary valves normally maintained in closed position by the pressure of the fluids, each set of said valves having a common supply port and a common exhaust port, individual manually operable means for opening and closing each of said primary valves, and automatically operable means for simultaneously opening said auxiliary valves.

6. The combination, in a duplex valve structure, of a pair of primary valves, a corresponding pair of auxiliary valves normally maintained in closed position by the pressure of the fluids, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for simultaneously opening said auxiliary valves.

7. The combination, in a duplex valve structure, of a pair of primary valves, a corresponding pair of auxiliary valves, each set of said valves having a common supply port and a common exhaust port, individual manually operable means for opening and closing each of said primary valves, and automatically operable means for simultaneously opening and closing said auxiliary valves, said latter means being manually adjustable.

8. The combination, in a duplex valve structure, of a pair of primary valves, a corresponding pair of auxiliary valves, each set of said valves having a common supply port and a common exhaust port, but each valve having individual inlet and outlet ports, such inlet ports of each set being in communication with the corresponding common supply port and such outlet ports being in communication with the corresponding common exhaust port, individual manually operable means for opening and closing each of said primary valves, and automatically operable means for simultaneously opening and closing said auxiliary valves, said latter means being manually operable.

9. The combination, in a duplex valve structure, of a pair of primary valves, a corresponding pair of auxiliary valves normally maintained in closed position, each set of said valves having a common supply port and a common exhaust port, individual manually operable means for opening and closing each of said primary valves, and automatically operable means for simultaneously opening said auxiliary valves, said latter means being manually adjustable.

10. The combination, in a duplex valve structure, of a pair of primary valves, a corresponding pair of auxiliary valves normally maintained in closed position, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for simultaneously opening said auxiliary valves, said latter means being manually adjustable.

11. The combination, in a duplex valve structure, of a pair of primary valves, a corresponding pair of auxiliary valves normally maintained in closed position by the pressure of the fluids, each set of said valves having a common supply port and a common exhaust port, individual manually operable means for opening and closing each of said primary valves, and automatically operable means for simultaneously opening said auxiliary valves, said latter means being manually adjustable.

12. The combination, in a duplex valve structure, of a pair of primary valves, a corresponding pair of auxiliary valves normally maintained in closed position by the pressure of the fluids, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for simultaneously opening said auxiliary valves, said latter means being manually adjustable.

13. The combination, in a duplex valve structure, of a pair of primary valves, a corresponding pair of auxiliary valves, each set of said valves having a common supply port and a common exhaust port, individual manually operable means for opening and closing each of said primary valves, and automatically operable means for opening and closing said auxiliary valves, said latter means being manually adjustable in respect to either or both of said auxiliary valves.

14. The combination, in a duplex valve structure, of a pair of primary valves, a corresponding pair of auxiliary valves, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for opening and closing said auxiliary valves, said latter means being manually adjustable in respect to either or both of said auxiliary valves.

15. The combination, in a duplex valve structure, of a pair of primary valves, a corresponding pair of auxiliary valves normally maintained in closed position, each set of said valves having a common supply port and common exhaust port, individual manually operable means for opening and closing each of said primary valves, and automatically operable means for opening said auxiliary valves, said latter means being manually adjustable in respect to either or both of said auxiliary valves.

16. The combination, in a duplex valve structure, of a pair of primary valves, a corresponding pair of auxiliary valves, normally maintained in closed position, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for opening said auxiliary valves, said latter means being manually adjustable in respect to either or both of said auxiliary valves.

17. The combination, in a duplex valve structure, of a pair of primary valves, a corresponding pair of auxiliary valves normally maintained in closed position by the pressure of the fluids, each set of said valves having a common supply port and a common exhaust port, individual manually operable means for opening and closing each of said primary valves, and automatically operable means for opening said auxiliary valves, said latter means being manually adjustable in respect to either or both of said auxiliary valves.

18. The combination, in a duplex valve structure, of a pair of primary valves, a corresponding pair of auxiliary valves normally maintained in closed position by the pressure of the fluids, each set of said valves having a common supply port and a common exhaust port, but each valve having individual inlet and outlet ports, such inlet ports of each set being in communication with the corresponding common supply port and such outlet ports of each set being in communication with the corresponding common exhaust port, individual manually operable means for opening and closing each of said primary valves, and automatically operable means for opening said auxiliary valves, said latter means being manually adjustable in respect to either or both of said auxiliary valves.

19. The combination, in a duplex valve structure, of a pair of primary valves, a corresponding pair of auxiliary valves, each set of said valves having a common supply port and a common exhaust port, manually operable means for opening and closing said primary valves, and automatically operable means for simultaneously opening and closing said auxiliary valves.

20. The combination, in a duplex valve structure, of a pair of primary valves, a corresponding pair of auxiliary valves, each set of said valves having a common supply port and a common exhaust port, but each valve having individual inlet and outlet ports, such inlet ports of each set being in communication with the corresponding common supply port and such outlet ports of each set being in communication with the corresponding exhaust port, manually operable means for opening and closing said primary valves, and automatically operable means for simultaneously opening and closing said auxiliary valves.

21. The combination, in a duplex valve structure, of a pair of primary valves, a corresponding pair of auxiliary valves normally maintained in closed position, each set of said valves having a common supply port and a common exhaust port, manually operable means for opening and closing said primary valves, and automatically operable means for simultaneously opening said auxiliary valves.

22. The combination, in a duplex valve structure, of a pair of primary valves, a corresponding pair of auxiliary valves normally maintained in closed position, each set of said valves having a common supply port and a common exhaust port, but each valve having individual inlet and outlet ports, such inlet ports of each set being in communication with the corresponding common supply port and such outlet ports of each set being in communication with the corresponding common exhaust port, manually operable means for opening and closing said primary valves, and automatically operable means for simultaneously opening said auxiliary valves.

23. The combination, in a duplex valve structure, of a pair of primary valves, a corresponding pair of auxiliary valves normally maintained in closed position by the pressure of the fluids, each set of said valves having a common supply port and a common exhaust port, manually operable means for opening and closing said primary valves, and automatically operable means for simultaneously opening said auxiliary valves.

24. The combination, in a duplex valve structure, of a pair of primary valves, a corresponding pair of auxiliary valves normally maintained in closed position by the pressure of the fluids, each set of said valves having a common supply port and a common exhaust port, but each valve having individual inlet and outlet ports, such inlet ports of each set being in communication with the corresponding common supply port and such outlet ports of each set being in communication with the corresponding common exhaust port, manually operable means for opening and closing said primary valves, and automatically operable means for simultaneously opening said auxiliary valves.

In testimony whereof, I have signed my name to this specification.

HARRY M. AUSTIN.